United States Patent [19]

Schutz et al.

[11] Patent Number: 4,948,444
[45] Date of Patent: Aug. 14, 1990

[54] PROCESS FOR PRODUCTION OF A BUNDLE OF HOLLOW SEMI-PERMEABLE FIBERS

[75] Inventors: Richard A. Schutz, Mulhouse; Patrick Paris, Tournefeuille, both of France

[73] Assignee: Societe Lyonnaise Des Eaux SA, Paris, France

[21] Appl. No.: 248,879

[22] Filed: Sep. 23, 1988

[30] Foreign Application Priority Data

Sep. 23, 1987 [FR] France .................. 87 13251

[51] Int. Cl.⁵ ................ B01D 63/02; B01D 67/00; B01D 69/08
[52] U.S. Cl. ....................... 156/168; 156/173; 156/175; 156/267; 156/296; 210/321.8; 210/321.89
[58] Field of Search ............. 156/168, 180, 175, 173, 156/296, 267; 210/321.8, 321.89, 500.23

[56] References Cited

U.S. PATENT DOCUMENTS

| 2,237,178 | 4/1941 | Freeman ................. 156/173 X |
| 3,442,002 | 5/1969 | Geary, Jr. et al. ....... 210/321.89 X |
| 4,226,378 | 10/1980 | Fitzgerald et al. ...... 210/500.23 X |
| 4,446,024 | 5/1984 | Baker ................... 210/500.23 X |
| 4,647,523 | 3/1987 | Bach .................... 210/321.8 X |
| 4,666,543 | 5/1987 | Kawano ................. 210/321.8 X |

FOREIGN PATENT DOCUMENTS

| 1514200 | 2/1968 | France . |
| 2525487 | 10/1983 | France . |
| 59-59217 | 4/1984 | Japan . |
| 61-86906 | 5/1986 | Japan ............... 210/321.89 |
| 61-265295 | 11/1986 | Japan ............... 210/500.23 |
| 62-144711 | 6/1987 | Japan ............... 210/500.23 |

Primary Examiner—Michael W. Ball
Assistant Examiner—Jeff H. Aftergut
Attorney, Agent, or Firm—Harold H. Dutton, Jr.

[57] ABSTRACT

The invention relates to a process and an apparatus for the production of a bundle of filaments from at least one filament, and its application especially to the production of a bundle of hollow semi-permeable fibers used for producing a filtration module. According to this invention, the filaments (1) is wound in a first step, in several superposed layers around a support plate (10) having two take-up edges (17) perpendicular to the direction of winding of the filament, and conferring on this filament an alternating transverse movement of decreasing amplitude in such a manner as to achieve a winding having a predetermined profile. The support plate (10) is then removed by retracting the take-up edges (17) toward each other so as to obtain a bundle having a transverse section which is a function of the profile of the winding and curved ends.

6 Claims, 2 Drawing Sheets

PROCESS FOR PRODUCTION OF A BUNDLE OF HOLLOW SEMI-PERMEABLE FIBERS

This invention relates to a process and an apparatus for the production of a bundle of filaments from at least one filament. The invention is applied in particular to the production of a bundle of hollow semi-permeable fibers used for the fabrication of filtration modules.

BACKGROUND AND OBJECTS OF THE INVENTION

The fabrication of a bundle of hollow fibers intended to be introduced into a housing for forming a filtration module is a delicate operation by reason of the fragility of these fibers which makes any manipulation difficult. For this reason, several techniques have been set up in order to minimize the number of human interventions during the production of this bundle.

The most commonly used technique is that of knitting a cast mesh on a large weaving frame. The knit obtained is formed by the fibers which form transversely the weft, and by the small chains which support the weft. This sheet is then rolled up into a spiral in such a manner as to form a bundle of parallel fibers. These operations are carried out by means of machines specially conceived for this purpose and only require slight human intervention. However, this techniques has several inconveniences. Firstly, this technique necessitates an initial modification of the machine for the feed of the weft because of the low strength of the fiber, and then for rolling up the sheet into a spiral. Secondly, the filaments of the chain crush the hollow fibers during formation of the small chains. Finally, it is possible that on certain machines the extremity of the fibers forming the bundle is open, which poses problems at the time of production of the filtration module. In effect, the sealing of this module is achieved at each of its extremities, by means of a hardenable resin, termed a potting resin, where risks of penetration of this resin to the interior of the fibers and thus obturating the fibers.

Another technique is described in French Pat. No. 82.07376 and consists in winding the fiber in a crossed manner around a cylinder of a polygonal section. The fibers then are cut at the level of each apex of the cylinder and the sheets thus formed are then rolled into a spiral in such a manner as to form bundles of fibers. This technique leads to the same inconveniences as the previously described technique.

A third technique described in U.S. Pat. No. 4,226,378 consist in rolling up the fiber around a polygonal wheel. The fibers are then cut at the level of each apex of the polygon in such a manner as to directly obtain a number of bundles equal in number to the number of sides of the polygonal wheel. A single machine is thus necessary to achieve the bundle. However, the disadvantage relating to the potting of these bundles in filtration modules remains.

A final technique such as described in French Pat. No. 1,514,200 and Japanese Pat. No. 59.059,217 consists in rolling up the fiber around a support of a polygonal or circular shape, adapted to permit the recovery of the rolled up form. The bundle is then formed by effecting a traction at the point of two diametrically opposed generatrices of this roll. The potting may then be achieved with closed fibers, without risk of penetration of the resin to the interior of these fibers. However, this process also has disadvantages. In the first case, by reason of the sizeable coefficient of friction of these fibers, the fact of carrying out a traction or drawing on the roll usually causes a notable modification of the cross-section of the roll and the arrangement of the fibers. It is thus very difficult to obtain a regular bundle having a predetermined form. Moreover, any traction or drawing, even weak, carried out on the fibers, causes a deformation of the structure thereof by reason of their slight linear elastic zone. For this reason, the hydraulic performances of the fibers is frequently diminished.

DESCRIPTION OF THE INVENTION

The present invention seeks to overcome the disadvantages of the above described techniques and has for its essential object to provide a simple, rapid and reliable process permitting the production, in a single operation, of a bundle of a predetermined cross section, formed of fibers the extremities of which are closed at the time of potting and of which the performance is not altered.

To this end, the invention relates to a process for the production of a bundle of filaments, especially hollow, semi-permeable fibers, characterized in that it comprises:

rolling up each filament in several superposed layers around a support plate provided with two extreme take-up edges perpendicular to the direction of winding of the filament, while conferring upon this filament an alternating transverse movement of decreasing amplitude from one layer to the next, in such a manner as to obtain a winding having a predetermined shape, withdrawing the support plate by bringing together the take-up edges, in such a manner as to obtain a bundle having a transverse section which is a function of the profile of the winding and with curved ends.

This process has the advantage of permitting the direct production on the support plate of a winding having a predetermined section permitting obtaining, after withdrawal of the support plate, a bundle formed of parallel fibers and of a form conjugate with the internal section of the housing of the filtration module. This process requires no operation of drawing or otherwise, and therefor permits producing a bundle of a well defined section of which the fibers are not altered.

Furthermore, each of the extremities of this bundle determines a closed volume and the potting of the bundle may thus be achieved with closed fibers and, as a result, without risk of penetration of the resin to the interior of these fibers.

After carrying out this potting, the curved ends of the fibers are then preferably cut in such a manner as to obtain a bundle of rectilinear fibers each emptying to the exterior of the pottings.

These pottings may be achieved either before introducing the bundle into the housing, or after the bundle is introduced into the housing. In the latter case, this bundle is covered with a support grill before its introduction into the housing. In either case, the final module is finally obtained by cutting or sawing the two ends of the housing and of the bundle, after polymerization.

Additionally, the bundle thus obtained may be subsequently advantageously twisted in such a manner as to make it more compact. This technique is of particular interest during production of modules in which the fluid to be purified flows on the exterior of the fibers. In effect, in this case, the more compact is the bundle and the greater is the probability for a particle to encounter an exchange wall, during liquid flow, is important.

The invention extends to an apparatus for carrying out this process of the type comprising:

means for feeding at least one filament adapted to deliver each filament with an average linear speed which is essentially constant, a filament guide associated with means for translatingly driving the same and able to displace the guide at a constant speed according to an alternating transverse movement of variable amplitude, in order to obtain a winding having a predetermined profile, winding means comprising a retractable support associated with means for driving the same in rotation.

According to the present invention, this apparatus is characterized in that the support is a support plate provided with two extreme take-up edges perpendicular to the direction of winding of the filament, able to be retracted toward each other in order to free the winding.

DESCRIPTION OF THE DRAWINGS

Other characteristics and advantages of the invention will become apparent from the detailed description which follows, with reference to the annexed drawings which show one preferred embodiment. In these drawings which are an integral part of the present description.

DESCRIPTION OF PREFERRED EMBODIMENTS

Figure 1:
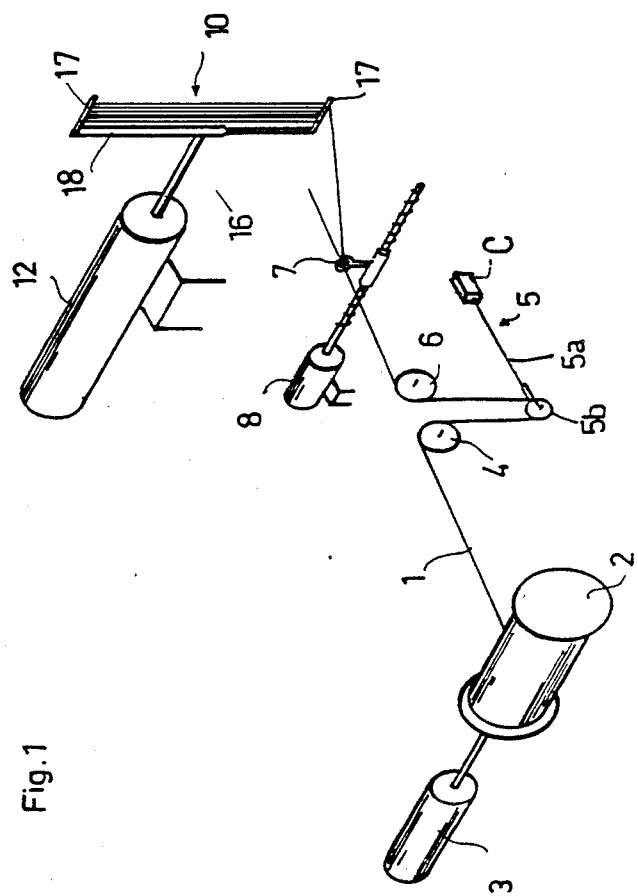
FIG. 1 is a perspective view of one apparatus according to the invention.

The apparatus shown in FIG. 1 is intended to produce a bundle of filaments from one or several filaments 1. It permits more particularly the production of a bundle of hollow, semi-permeable fibers intended for the fabrication of filtration modules.

This apparatus comprises a feed spool 2 from the fiber spinning or drying unit, depending upon whether working with dry or wet fibers. This spool 2 is mounted in a known manner on the end of a reduction motor shaft 3 adapted to drive the spool with a variable speed of rotation, in such a manner as to deliver the fiber 1 with a linear speed which is essentially constant.

This fiber 1 is then guided, by means of a reference pulley 4 toward a tension regulator 5. This tensioner comprises an articulated arm 5a having at its free extremity a pulley 5b around which the fiber 1 travels.

This fiber 1 is then guided by the intermediary of a second reference pulley 6 toward a filament guide 7 comprising in the example a ring provided with a peripheral transverse slot, arranged obliquely with respect to the direction of advance of the fiber 1 and intended to permit easy threading of this fiber into the filament guide. This ring, along with all of the pulleys, furthermore, are preferably made of Teflon so as to not damage the fiber.

The filament guide 7 is driven transversely by means of a motor 8, such as a stepping motor, adapted to displace the filament guide according to an alternating movement of variable amplitude. This motor 8 is controlled by means of a programmed control unit (not shown) adapted to confer on the filament guide 7 an alternating movement of decreasing amplitude in such a manner as to obtain a winding having a predetermined profile on a support rotatably driven by means of a reduction motor and arranged downstream from the filament guide 7.

This support 10 has a planar shape and is positioned perpendicularly to the direction of advance of the fiber. It is supported on the end of the shaft of the reduction motor 12. It being given that the distance between the filament guide 7 and the point of winding of the fiber 1 on this support varies constantly during rotation of the support, the speed of rotation of the reduction motor 12 is, therefor, controlled by the detection means C for detecting the angular position of the tension regulator.

This detection means is adapted to cause an increase or a decrease of the angular speed of the winding support 10 according to the following principle: when the winding speed of the fiber 1 downstream of the articulated arm 5a is greater that the linear speed thereof at the output of the feed spool 2, the articulated arm 5a turns in a clockwise direction, with reference to FIG. 1. The position detector C then causes a decrease in the angular speed of the winding support 10, which causes a rotation of the articulated arm 5a in a counterclockwise direction and consequently a new increase in the angular winding speed controlled by the position detector C.

Such a support 10 permits winding up of the fibers parallel to one another due to the planar form thereof. The only operation necessary to produce the bundle then comprises retracting this support 10 in its plane.

To this effect, this support comprises two support rods 17 arranged perpendicularly to the winding direction of the fiber and connected by a telescopic mounting 18.

Figure 2A:
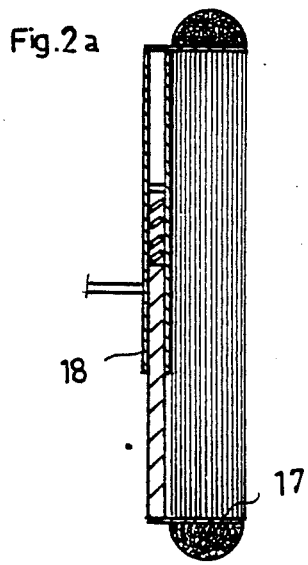
FIGS. 2a and 2b are schematic views illustrating the steps permitting production of a rectilinear bundle from a winding of fibers on this apparatus.
Figure 2B:
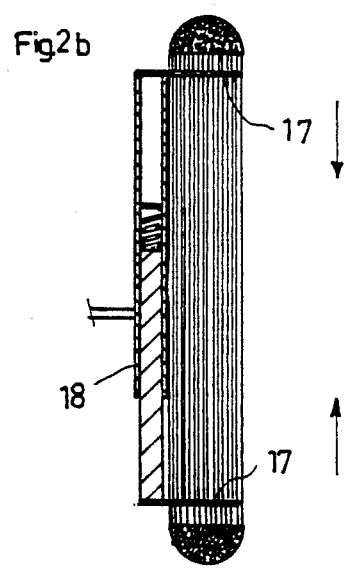
Figure 3A:
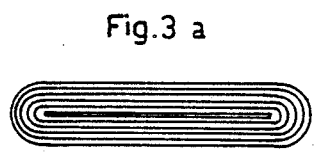
FIGS. 3a through 3d are schematic views illustrating the steps permitting the fabrication of a filtration module by means of a bundle produced in accordance with the invention.

The fiber 1 comes then to be wound around the support rods 17 (FIG. 2a) and the only operation necessary to recover the bundle comprises reducing the length of the mounting 18 (FIG. 2b).

The bundle thus obtained is used for producing a filtration module. For this purpose, two methods may be used.

Figure 3B:
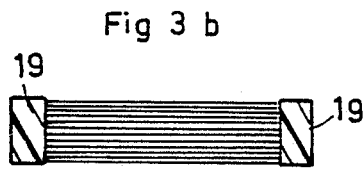
Figure 3C:
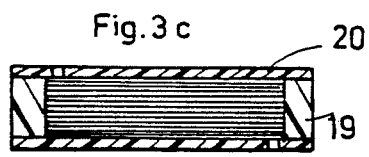
Figure 3D:
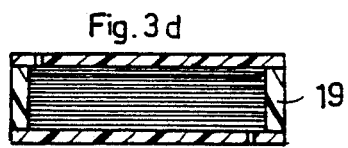

The first method, shown in FIGS. 3a through 3d, comprises producing firstly a potting 19, by means of a hardenable resin, at the two ends of the bundle (FIG. 3b). This bundle, thus fixed by the two pottings 19 is then introduced into a housing 20 (FIG. 3c). The last operation comprises then cutting the two ends of the bundle and of the housing 20 after polymerization of the resin in such a manner as to obtain a final module enclosing a bundle of parallel fibers of which the ends empty to the exterior of the pottings 19 (FIG. 3d).

Figure 4A:
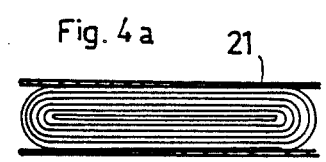
FIGS. 4a and 4b are schematic views illustrating a variation of the operation for producing this module.
Figure 4B:
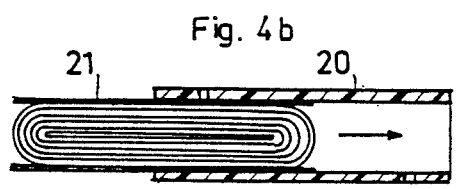
Figure 4C:
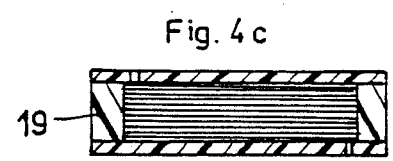
Figure 4D:
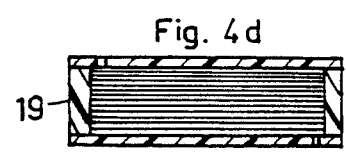

According to a second method, the bundle is initially covered by a support grill 21 (FIG. 4a) and then introduced into the housing 20 (FIG. 4b). The pottings 19 are then achieved after placement of the bundle into the housing 20 (FIG. 4c), the last operation comprising, as before, cutting the two ends of the module, after polymerization of the resin (FIG. 4d).

The essential advantage of these two methods resides in the fact that the fibers are closed during the production of the pottings 19, avoiding all risk of introducing the resin into the interior of these fibers.

We claim:

1. A process for producing a bundle of hollow, semi-permeable fibers from at least one filament (1) comprising winding said filament around a support member having two take-up edges spaced from and parallel to a winding axis so as to form a plurality of superposed layers thereon, conferring upon said filament during winding an alternating transverse movement of an amplitude decreasing in successive layers so as to produce a winding on said support member of a predetermined profile corresponding to said support member, retracting the edges of said support member and removing said wound filament from said support member to form a bundle having a profile corresponding to said support member and curved ends.

2. A process as in claim 1 and including twisting said bundle so as to make the bundle more compact.

3. A process as in claim 1 and including potting the ends of said bundle in a hardenable resin, causing said resin to harden, and cutting the potting and the curved ends of said bundle so as to produce a potted bundle of open ended rectilinear fibers.

4. A process as in claim 1 and including potting the ends of said bundle in a hardenable resin, causing said resin to harden, placing the potted bundle of fibers into a housing (20), cutting the potted bundle, the curved ends of said fibers and said housing so as to produce a potted bundle of open ended rectilinear fibers in said housing.

5. A process as in claim 1 and including supporting said bundle with a supporting grill, placing the supported bundle into a housing (20), potting the ends of said bundle within said housing, and cutting the housing and the potted ends of said bundle after polymerization of the resin.

6. A process as in claim 1 and wherein said support member comprises two spaced, parallel support rods (17) perpendicular to the direction of travel of said filament, and retracting the edges of said support member by moving said support rods toward each other, thereby releasing said wound filament.

* * * * *